US008614259B2

(12) United States Patent
Chrzanowski et al.

(10) Patent No.: US 8,614,259 B2
(45) Date of Patent: *Dec. 24, 2013

(54) PROCESS OF RECYCLING POWDER COAT MATERIAL AND COMPONENT MADE THEREOF

(75) Inventors: Dan Chrzanowski, Clinton Township, MI (US); Brandon Chrzanowski, St. Clair Shores, MI (US)

(73) Assignee: PFR Patent Holding Company, LLC, St. Clair Shores, MI (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/455,192

(22) Filed: Apr. 25, 2012

(65) Prior Publication Data

US 2012/0214905 A1  Aug. 23, 2012

Related U.S. Application Data

(63) Continuation-in-part of application No. 12/399,583, filed on Mar. 6, 2009, now Pat. No. 8,168,688.

(60) Provisional application No. 61/034,308, filed on Mar. 6, 2008.

(51) Int. Cl.
*C08J 11/04* (2006.01)

(52) U.S. Cl.
USPC ............... 521/40; 521/40.5; 521/41; 521/46; 521/47.5; 521/48; 521/49; 521/49.8; 528/502 R; 528/502 C; 528/502 F; 264/37.25; 264/37.26; 264/37.27; 264/239; 134/38

(58) Field of Classification Search
USPC ..................... 521/40, 40.5, 41, 46, 47.5, 48; 528/502 R, 502 C, 502 F; 264/37.25, 264/37.26, 37.27, 239; 134/38
See application file for complete search history.

(56) References Cited

U.S. PATENT DOCUMENTS

| 4,303,559 A | 12/1981 | Trost |
| 5,160,628 A | 11/1992 | Gerace et al. |

FOREIGN PATENT DOCUMENTS

JP  2004100066 A  4/2004

*Primary Examiner* — Frances Tischler
(74) *Attorney, Agent, or Firm* — Gifford, Krass, Sprinkle, Anderson & Citkowski, P.C.; Thomas E. Anderson

(57) ABSTRACT

A process for making a solid component out of recycled powder coat is provided. The process can include providing a powder coat material and providing a second material. Thereafter, the powder coat and the second material are mixed to produce a powder coat-second material mixture. The powder coal-second material mixture is processed in order to produce a polymer containing precursor. The processing can include granulating or densifying the powder coat-second material mixture. After the precursor has been produced, it can be placed within a molding machine and a solid component is molded. The molding machine can be an injection molding machine, an extrusion molding machine or a blow molding machine.

9 Claims, 3 Drawing Sheets

US 8,614,259 B2

PROCESS OF RECYCLING POWDER COAT MATERIAL AND COMPONENT MADE THEREOF

CROSS-REFERENCE TO RELATED APPLICATIONS

This application is a continuation in part and claims priority to U.S. Pat. No. 8,168,688, which in turn claims priority of U.S. Provisional Patent Application Ser. No. 61/034,308 filed Mar. 6, 2008, both of which are incorporated in their entirety herein by reference.

FIELD OF THE INVENTION

The present invention is related to a process for recycling powder coat material. In particular, the present invention is related to a process for recycling powder coat material in which a solid component can be made therefrom.

BACKGROUND OF THE INVENTION

Paint is a commonly manufactured and used substance with millions of tons produced and used every year. As such, paint waste, often referred to and/or in the form of paint sludge and/or powder coat waste, exceeds thousands of tons every year and can create a variety of environmental and economic problems. In addition, increasingly stringent governmental pollution regulations as well as the cost of waste disposal have led to increased concerns regarding the treatment and disposal of paint sludge.

Paint sludge can include a variety of uncured polymer resins, pigments, curing agents, surfactants and other minor formulation ingredients. In addition, the paint sludge can contain water and/or a variety of organic solvents.

Powder coating, often referred to as "powder coat", is a type of coating process that is typically applied using a free-flowing, dry powder. The process does not require a solvent to keep a binder and filler parts in a liquid suspension form as with paint and the dry powder is usually applied electrostatically and then cured under heat to allow it to flow and form a coating layer. The dry powder can be a thermoplastic or a thermoset polymer and is the process is used for coating metals, such as "whiteware", aluminum extrusions, automobile parts, bicycle parts and the like. However, the process can result in waste powder particles that do not get applied to a substrate and up to 5% of the dry powder as originally produced is not suited for the coating application. Therefore, a process for recycling the powder coat and/or a component made out of recycled powder coat would be desirable.

SUMMARY OF THE INVENTION

A process for making a solid component out of recycled powder coat is provided. The process can include providing powder coat particles, hereafter also referred to simply as powder coat, and providing a second material, the powder coat being a product of excess, waste and/or unsuitable powder coat particles resulting from powder coating an object and/or manufacture of the powder coat itself. The powder coat and the second material can be mixed to produce a powder coat-second material mixture and me powder coat-second material mixture can be processed in order to produce a precursor polymer in the form of particles, granules, flakes and the like. The processing can include granulating or densifying the powder coat-second material mixture. After the precursor has been produced, it is placed within a molding machine and a solid component is molded. The molding machine can be an injection molding machine, an extrusion molding machine or a blow molding machine. It is appreciated that a third material, a fourth material and additional materials can also be mixed with the powder coat.

The powder coat can be collected from excess automotive powder coating, however this is not required. The second material can be a virgin material such as a virgin polymer. In addition, the second material can contain recycled material such as a recycled polymer, recycled polymer filter media and the like.

In some instances, the powder coat-second material mixture has a powder coat content of between 1 to 99 weight percent. In other instances, the powder coat content is between 10 to 90 weight percent, 20 to 80 weight percent, 30 to 70 weight percent or 40 to 60 weight percent. The solid component can have a density of greater than 80 percent and in some instances a density greater than 85 percent. In addition, the solid component can be in the form of a pallet, milk crate, dunnage and the like.

DETAILED DESCRIPTION OF THE INVENTION

Figure 1:
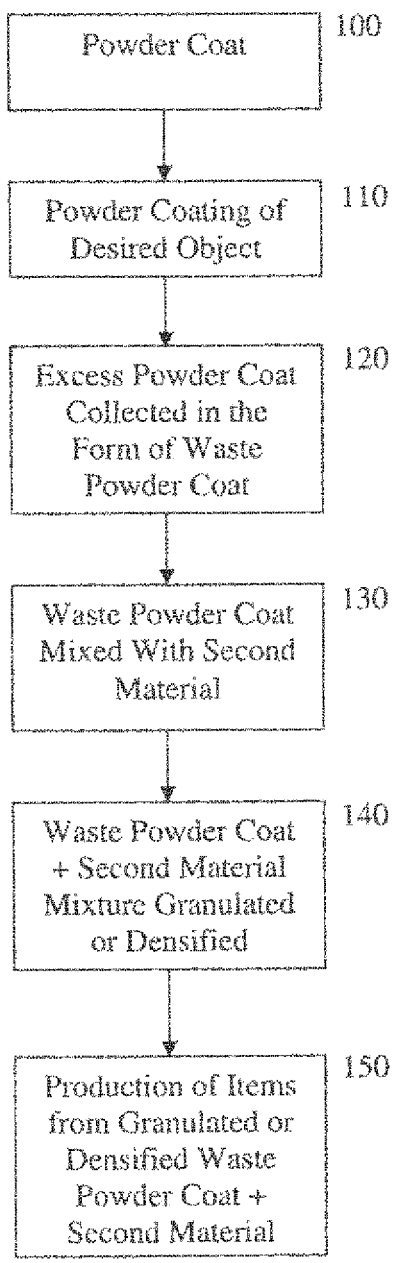
FIG. 1 is a schematic diagram of a process for producing a solid component from recycled powder coat according to an embodiment of the present invention.

The present invention includes a process for recycling powder coat. As such, the process has utility for reducing waste sent to and placed in landfills.

The process includes taking powder coat particles, often referred to simply as "powder coat", and mixing it with a second material, taking the powder coat-second material mixture and granulating or densifying it, and then producing a solid component front the granulated or densified powder coat-second material mixture. It is appreciated that other types of processes besides granulating or densifying can be used to transform the powder coat into a form or structure that can be fed into a machine that produces the solid component. It is further appreciated that the term "solid component" as used herein, is defined as a component that has one or more physical dimensions that do not change when the component is placed unconstrained on a flat surface.

The second material can be a polymer, a natural fiber, paper and the like. The polymer, natural fiber and/or paper can be virgin material or recycled material. If the material is recycled, it can include recycled material from filter media, motor vehicle components, carpet, tires, furniture, building products, plastic bags, household items, and the like.

The granulating of the powder coat-second material mixture can be performed with a granulator. A granulator can have a closed chamber with one or more electric motors that turn a rotor with cutting knives attached thereto. As the powder coat-second material mixture enters the closed chamber, the rotor sweeps by and cuts the material between a fixed position knife and one or more rotating blades. The powder coat-second material mixture remains within the closed chamber until it is cut into a size that can pass through a filter such as a screen. Pressurized air can provide cooling and facilitate material flow through the closed chamber with finished granules or particle sizes typically ranging from 0.125 inches to 0.375 inches.

The material can also be densified using a densifier. A densities also known as an agglomerator, can transform a relatively light and fluffy material into particles that are dense enough to feed into a hopper of an injection molding machine, extrusion molding machine and the like. The densifier typically has a cylinder with two blades that spin at one end of the cylinder and create friction with the material in the cylinder. The friction results in an increase of the temperature of the material until it reaches a softening point. Thereafter, water can be added to cool the material down, and after the wafer evaporates, the material can be discharged from the cylinder in the form of chips, particles, granules and the like.

The powder coat can be obtained from excess or waste powder coat particles used in a powder coating process used in most any industrial setting, for example and for illustrative purposes only, excess powder coat resulting from the powder coating of motor vehicles parts within a motor vehicle assembly facility. In addition, the powder coat can be obtained from powder coat particles known as "fines" that are obtained from the process of manufacturing the powder coat itself and are undesirable for use in the powder coating process. It is appreciable that both types of powder coat particles, i.e. waste powder coat particles and the fines can be considered and referred to as waste powder coat and/or waste powder coat particles.

The powder cost can be made from any powder coat material known to those skilled in the art, illustratively including polyester, polyurethane, polyester-epoxy (known as hybrid), straight epoxy (fusion bonded epoxy) and acrylics. In addition, the powder coat can be made from materials not currently known to make powder coat particles but will be used in the future.

If the second material contains a filter media, the filter media can be obtained from new filter media products and/or recycled filter media. If recycled filter media is used, filter media supplied by one or more methods disclosed in commonly assigned U.S. patent application Ser. No. 12/258,284 filed on Oct. 24, 2008, and incorporated herein in its entirety by reference can be used. A third material, a fourth material, etc. can also be mixed with the powder coat and be used to modify the chemical, mechanical and/or physical properties of the solid component that is produced with the recycled powder coat. For example and for illustrative purposes only particles, fibers, flakes and the like made from glass, carbon, SiC, SiN, etc. can be mixed with the powder coat to make a solid component.

The ratio of powder coat to second material can be adjusted depending upon the solid component to be made therefrom, with weight percentages ranging from 1 to 99 weight percent powder coat and 99 to 1 weight percent second material. In some instances, the powder coat-second material mixture and/or the solid component can have a powder coat content of between 10 to 90 weight percent. In other instances, the powder coat content can be between 20 to 80 weight percent, 30 to 70 weight percent or 40 to 60 weight percent it is appreciated that the remainder of the powder coat-second material mixture and/or the component is made from the second material and/or any additional fillers that may be included to decrease cost improve mechanical properties, improve chemical properties and the like. The solid component can have a density of greater than 80 percent and in some instances a density greater than 85 percent. It is appreciated that one skilled in the art will understand that the density percentage is a comparison to a theoretical density, e.g. 80 percent of theoretical density.

Turning now to FIG. 1, an embodiment of a process to recycle powder coat is disclosed with powder coat being supplied at step 100. The powder coat is used to coat desired objects at step 110 and excess powder coat is collected at step 120. The powder coat is mixed with a second material at step 130 and the powder coat plus second material mixture can be processed in a variety of ways such mat pellets, granules, chips, small rods and the like can be used in a plastic molding machine to form desired items. The powder coat can also be mixed with a third material, a fourth material and the like in order to obtain desired chemical, physical and/or mechanical properties in a manufactured solid component. In some instances, the powder coat and second material mixture can be granulated or densified as illustrated at step 140. Thereafter, the production of desired solid components such as household items, automotive components, industrial components and the like is afforded at step 150.

It is appreciated that the powder coal and/or the powder coat mixed with the second material can be optionally dried at step 135 using any drying process and/or drying machinery known to those skilled in the art. The drying can result in the removal of excess water, volatile liquids and vapors, undesirable smells and the like from the powder coat and/or powder coat mixed with the second material and can include one or more drying steps. In addition, the drying can be performed using a sludge dryer, an oven, a conveyor belt with a heat lamp and the like. It is appreciated that air scrubbers, fuming hoods and the like can also be used to properly process any gases, vapors, etc., that may evolve from the powder coat before, during and/or after drying. It is further appreciated that the drying of the powder coat and/or the powder coat mixed with the second material can result in powder coat that is easier to handle, ship, process and the like.

Figure 2:
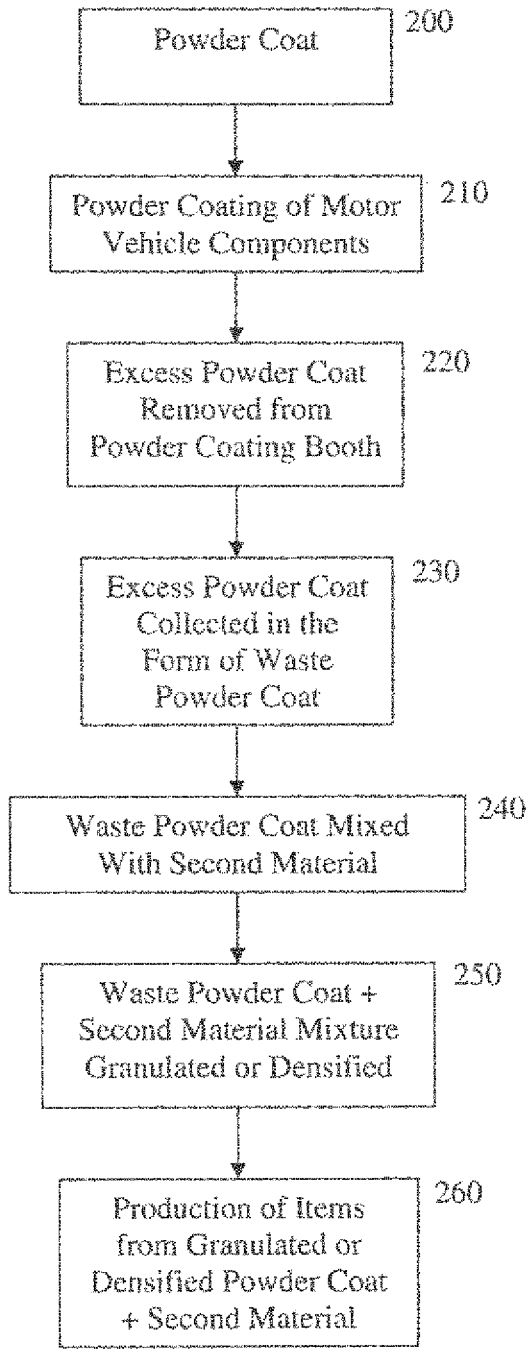
FIG. 2 is a schematic diagram of a process for producing a solid component from recycled powder coat according to another embodiment of the present invention.

Turning now to FIG. 2, powder coat supplied, at step 200 is used for powder coating motor vehicles parts at step 210 with excess powder coat removed from the coating environment (hereafter referred to as the powder coating booth) within an automotive assembly facility at step 220. The excess powder coat particles are collected in the form of waste powder coat at step 230 and then mixed with a filter media material at step 240. An optional drying step of the powder coat and/or the powder coat mixed with the filer media as discussed above can be provided at step 245. Similar to the embodiment shown in FIG. 1, the powder coat-filter media mixture is granulated or densified at step 250 and solid components are produced using the granulated or densified powder coat-filter media mixture at step 260. In some instances, the granulation or densification of the paint sludge-filter media mixture at step 250 produces granules or pellets containing polymer that fit or pass through a wire screen. The wire screen can have specific sized openings, for example $3/16$, $3/8$ or $1/2$ inch screen. These granules or pellets are then placed within a polymer molding machine and through compression and/or heating used to mold a desired component. Molding methods such as injection molding, extrusion molding, blow molding, thermal blow molding, thermal form molding and/or compression molding can be used to produce desired solid components with the granulated and/or densified paint sludge-second material mixture disclosed herein.

Figure 3:
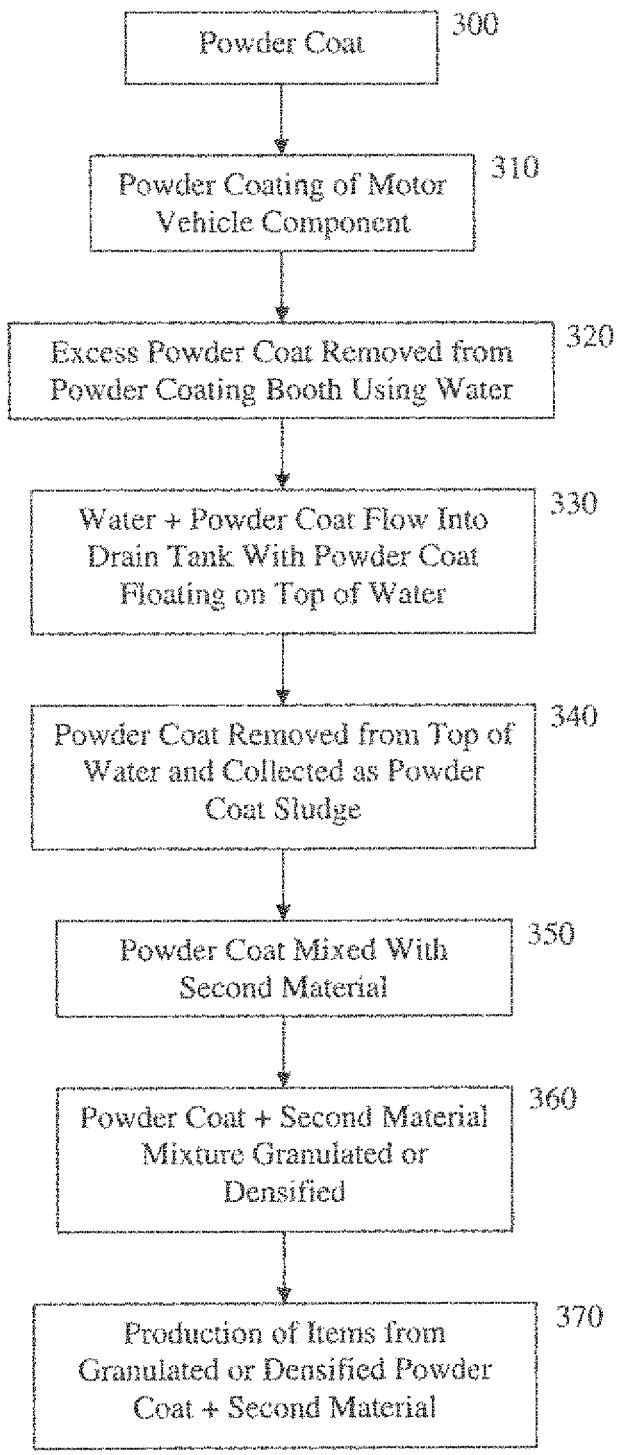
FIG. 3 is a schematic diagram of a process for producing a solid component from recycled powder coat according to yet another embodiment of the present invention.

Another embodiment is illustratively shown in FIG. 3 wherein powder coat supplied at step 300 is used for powder coating motor vehicles parts at step 310 and excess powder coat removed from the powder coating booth at step 320. The powder coat is removed from the powder coating booth using water and the water plus powder coat then flow into a drain tank at step 330. It is appreciated that the term "water" as used herein can include generally plain water or a water mixture such as a water/chemical mixture and the like. The drain tank contains water wife the powder coat floating on the top of the water surface.

The powder coat is removed from the top of the water and collected as waste powder coat at step 340. The powder coat can be collected in a sludge tank after it has been removed from the drain tank. In some instances the powder coat is at least partially dried in the sludge tank and filter media can be used in the sludge tank to assist in the drying and/or any other subsequent desirable processing of the powder coat. It is appreciated that the powder coat that is collected at stop 340 may or may not include filter media and for the purposes of the present invention, the term "powder coat" can include powder coat with filter media therein. After the waste powder coat is collected, and any desired processing of the powder coat known to those skilled in the art performed thereon, the powder coat is mixed with a second material at step 350. It is appreciated that the second material can be a filter media, however this is not required. In addition, the powder coat and/or powder coat-second material mixture can be dried at optional step 345 as discussed above.

Mixing of the powder coat with the second material can include one or more steps wherein the powder coat is placed proximate to the second material such that the powder coat and second material can be placed within a granulator or densifier. In addition, a third material, fourth material and the like can be mixed with the powder coat as discussed above. The powder coat-second material mixture is granulated or densified at step 360 with pellets and/or granules produced. Production of items from the granulated or densified powder coat-second material mixture is afforded at step 370 using a molding machine. In one instance, 65 to 75 weight percent powder coat is mixed with 25 to 35 weight percent filter media in a densifier, the densifier operated for 1 to 30 minutes until pellets are formed. Thereafter, pellets from the densifier are melted and processed with a compression mold machine in order to form a molded component.

It is appreciated that filter media obtained and/or recycled, in addition to virgin filter media, can be used, as well as recycled paper and material obtained from recycled motor vehicle components, carpet, tires, furniture, building products, plastic bags, household items and the like. It is also appreciated that various modifications are readily made to the embodiments of the present invention described herein without departing from the spirit and scope thereof. Accordingly, it is to be understood that the invention is not to be limited by the specific illustrated embodiment or embodiments, but by the scope of the appended claims.

We claim:

1. A process for making a solid component out of recycled powder coat, the process comprising:
   providing powder coat;
   providing a second material in the form of recycled polymer filter media;
   mixing the powder coat with the second material to produce a powder coat-second material mixture;
   processing the powder coat-second material mixture, the processing selected from the group consisting of granulating and densifying, the processing producing a precursor made from recycled powder coat;
   placing the precursor in a molding machine, the molding machine selected from the group consisting of an injection molding machine, an extrusion molding machine, a blow molding machine, a thermal blow molding machine, a thermal form molding machine and compression molding machine; and
   molding a solid component from the precursor.

2. The process of claim 1, wherein the powder coat is made from a polymer selected from a group consisting of a polyester, a polyurethane, a polyester-epoxy, a straight epoxy and an acrylic.

3. The process of claim 1, wherein the powder coat-second material mixture has a powder coat content of between 1 to 99 weight percent.

4. The process of claim 3, wherein the powder coat content is between 20 to 80 weight percent.

5. The process of claim 4, wherein the powder coat content is between 30 to 70 weight percent.

6. The process of claim 1, wherein the solid component has a density of greater than 80 percent of theoretical density.

7. The process of claim 6, wherein the solid component has a density of greater than 85 percent of theoretical density.

8. The process of claim 1, wherein the powder coat is obtained from powder coat particles used to powder coat a motor vehicle component.

9. The process of claim 1, wherein the powder coat is obtained from powder coat particles used to powder coat a motor vehicle component on an automotive assembly line.

* * * * *